United States Patent [19]
Tamura et al.

[11] Patent Number: 5,203,946
[45] Date of Patent: Apr. 20, 1993

[54] METHOD OF, AND APPARATUS FOR MANUFACTURING ELONGATE PLASTIC ARTICLES

[75] Inventors: Tatsuya Tamura; Tetsuo Hotta, both of Yokohama, Japan

[73] Assignee: Hashimoto Forming Industry Co., Ltd., Japan

[21] Appl. No.: 729,344

[22] Filed: Jul. 12, 1991

Related U.S. Application Data

[62] Division of Ser. No. 411,887, Sep. 25, 1989, Pat. No. 5,061,335.

[51] Int. Cl.$^5$ .............................. B29C 47/00
[52] U.S. Cl. .................... 156/350; 156/244.18; 264/177.1
[58] Field of Search ................ 156/244.11, 244.18, 156/244.25, 350; 264/177.1, 177.2; 425/140

[56] References Cited

U.S. PATENT DOCUMENTS

| | | | |
|---|---|---|---|
| 4,209,476 | 6/1980 | Harris | 264/40.4 |
| 4,851,067 | 7/1989 | Ogawa et al. | 156/244.25 X |
| 4,865,796 | 9/1989 | Tamura et al. | 264/177.2 X |
| 4,960,375 | 10/1990 | Saito et al. | 264/177.1 X |

Primary Examiner—David A. Simmons
Assistant Examiner—James J. Engel, Jr.
Attorney, Agent, or Firm—Stevens, Davis, Miller & Mosher

[57] ABSTRACT

Method of, and apparatus for continuously manufacturing elongate articles with a plurality of segments of basically same and slightly different cross-sections, such as upper and side segments of automobile molding members. The apparatus includes a single die head formed with a common orifice and at least one additional orifice, as well as a device for selecting and controlling operational modes of the apparatus. The device may comprise a guide device which is movable between different positions corresponding to respective operational modes of the apparatus, and which serves to guide synthetic resin material extruded from the additional orifice. The guide member maintains in its one position a spaced relationship of synthetic resin materials extruded from the orifices to form one segment, and causes in another position the synthetic resin materials to adhere with each other to form another segment.

4 Claims, 7 Drawing Sheets

FIG. 1

FIG_2

FIG_3

FIG_11

FIG_12

METHOD OF, AND APPARATUS FOR MANUFACTURING ELONGATE PLASTIC ARTICLES

This is a divisional of application Ser. No. 411,887 filed Sep. 25, 1989 now U.S. Pat. No. 5,061,335.

BACKGROUND OF THE INVENTION

1. Field of the Invention

The present invention relates to a method of, and an apparatus for manufacturing elongate plastic articles, e.g. molding members for automobiles, having a cross-section which varies in the longitudinal direction of the article.

2. Description of the Related Art

A variety of molding members are widely used for automobiles, such as front or rear window molding members, body side molding members, etc. Among others, Japanese Patent Application Laid-open Publication No. 61-135,824 discloses a windshield molding member which includes an upper segment to extend along an upper edge of a windshield plate, a pair of side segments to extend along side edges of the windshield plate, and a pair of corner portions connecting the upper and side segments into an integral component.

In the known molding members mentioned above, the upper and side segments are generally composed of a synthetic resin material extruded in to respectively predetermined cross-sections which are basically same with and slightly different from each other. That is, the upper segment includes a main body which is provided with a first lip section to be engaged with the outer surface of a windshield plate, a second lip section to be engaged with the outer surface of a vehicle body panel, and a leg section to be inserted into a gap between the edge of the windshield plate and the body panel. The leg section has fins on both sides to be engaged with the periphery of the windshield plate and the body panel, respectively, so as to prevent undesirable withdrawal of the lip section out of the gap. The upper segment may have an ornamental film and a core element arranged in the main body and the leg section, respectively, depending upon ornamental and/or functional requirements. On the other hand, the side segment has a basic cross-section which is the same as that of the upper segment, as well as an additional cross-section in the form of a ridge on the first lip section, which is adapted to define a weir or channel extending along a side edge of the windshield plate.

The upper segment without the ridge serves to realize a flush outer surface of the automobile body along the upper edge of the windshield plate, while the ridge on the side segment achieves the functions to guide rain water on the windshield plate to flow along the weir or channel, and to thereby, prevent the rain water from flowing onto side windows across the side segment and the neighboring body panel portion (or pillar) to disturb the driver's sight through the side windows.

In order to manufacture the upper and side segments of mutually different cross-section, it has been a conventional practice to prepare and use two kinds of exchangeable extrusion dies, one for the upper segments and the other for the side segments, which are expensive and make it thus difficult to reduce the production cost of the molding members. Not only the exchange of the dies requires troublesome and time-consuming manual operations, but also it is necessary, after the exchange of the die and commencement of extrusion of synthetic resin material therefrom, to wait for some time until the die begins to stably extrude a continuous body with a desired accuracy of the cross-section.

Alternate use of different dies to produce different segments of basically same cross-section thus proved to be quite disadvantageous in many cases, particularly when a relatively small number of segments of various cross-sections are to be produced in each production lot. Moreover, the use of separate corner segments for connecting the upper and side segments with each other increases the production cost, and may often result in the formation of connection lines between the upper and corner segments and also between the corner and side segments, and hence in an undesirable degradation of the appearance.

SUMMARY OF THE INVENTION

It is therefore an object of the present invention to provide a novel method and apparatus whereby different segments of an elongate article of basically the same and slightly different cross-section can be readily and reliably manufactured in a continuous and alternate manner, and with a higher productivity and at a reduced cost.

According to one aspect of the present invention, there is provided a method of manufacturing elongate articles including a plurality of segments which are connected with each other in the longitudinal direction of the article, each segment having a common cross-sectional portion which is common to all the segments, at least one segment further having at least one additional cross-sectional portion, said method comprising the steps of:

[A] using a single extrusion die head with a common orifice having a cross-section which corresponds to that of said common cross-sectional portion of a segment, and also with at least one additional orifice having a cross-section which corresponds to that of said additional cross-sectional portion of said at least one segment;

[B] alternately and continuously carrying out a first extrusion phase in which a molten synthetic resin material is extruded from said common orifice of said extrusion die head to form a first segment, and a second extrusion phase in which molten synthetic resin materials are extruded from said common orifice and at least one of said additional orifices of said extrusion die head, and are caused to adhere with each other while they are still sufficiently hot to achieve the adhesion, to form a second segment; and

[C] detecting the length of the synthetic resin material extruded from said common orifice, and effecting a change from said first extrusion phase to said second extrusion phase, and vice versa, according to the detected length of the synthetic resin material.

According to another aspect of the present invention, there is provided an apparatus for manufacturing elongate articles including a plurality of segments which are connected with each other in the longitudinal direction of the article, each segment having a common cross-sectional portion which is common to all the segments, at least one segment further having at least one additional cross-sectional portion, said apparatus comprising:

[A] a single extrusion die head formed with a common orifice of a cross-section which corresponds to that of said common cross-sectional portion of a segment, and also with at least one additional orifice of a cross-section corresponding to that of said additional cross-sectional portion of said at least one segment;

[B] means for detecting the length of the synthetic resin material extruded from said common orifice; and

[C] means for selecting and controlling first and second operational modes of the apparatus in accordance with said detected length such that, in said first operational mode of the apparatus, synthetic resin material is extruded from said common orifice of said die head to form a first extruded body corresponding to a first segment and, in said second operational mode of the apparatus, synthetic resin materials are extruded from said common orifice and at least one additional orifice of said die head and caused to adhere with each other while they are still sufficiently hot to achieve the adhesion, to form a second extruded body corresponding to a second segment.

The present invention makes use of a single extrusion die head with a common orifice and at least one additional orifice. A first segment, e.g. an upper segment of a windshield molding member, can be formed either by extruding molten synthetic resin material from the common orifice alone, or by extruding resin materials from both the common orifice and the additional orifice while preventing adhesion of the resin material from the additional orifice with the resin material from the common orifice. In the latter case, the resin material from the additional orifice may be recovered and used again. On the other hand, a second segment, e.g. a side segment of the molding member, can be formed by extruding resin materials from both the common orifice and the additional orifice and causing the extruded materials to adhere with each other while they are still sufficiently hot to achieve the adhesion.

The present invention may be applied for manufacturing not only molding members for automobiles, but also various kinds of other elongate articles, such as plastic hoses or tubes with ornamental longitudinal ridges on the outer periphery of the limited longitudinal regions.

DETAILED DESCRIPTION OF THE PREFERRED EMBODIMENTS

The present invention will be more fully explained hereinafter, with reference to some preferred embodiments shown in the attached drawings.

Figure 1:
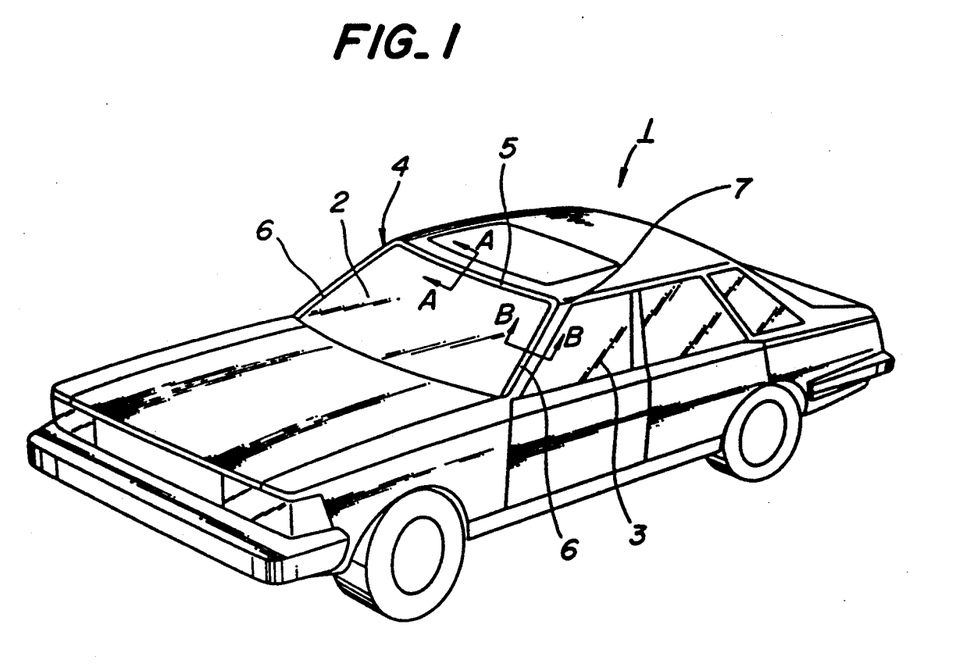
FIG. 1 is a perspective view of an automobile including molding members which may be manufactured in accordance with the present invention.

There is shown in FIG. 1 an automobile with a body 1, a windshield plate 2, side windows 3, as well as a windshield molding member 4 which is arranged along the periphery of the windshield plate 2, and which may be manufactured in accordance with the present invention. The windshield plate 2 may be an inorganic glass plate or an appropriate synthetic resin plate with transparency, such as polycarbonate resin or acryllic resin plate. The molding member 4 includes an upper segment 5 to extend along an upper edge of the windshield plate 2, a pair of side segments 6 to extend along the side edges of the windshield plate 2, and a pair of corner segments 7 connecting the upper and side segments 5, 6 into an integral component.

The molding member 4 may be composed of a soft polyvinyl-chloride (PVC) resin, ionomer resin, ethylenevinyl acetate (EVA) copolymer resin, transparent cellulose acetate butylate (CAB) resin, or of other suitable thermoplastic elastomer or synthetic resin with flexibility, extruded into respectively predetermined cross-sections of the upper and side segments 5, 6 which are basically the same and slightly different from each other.

Figure 2:
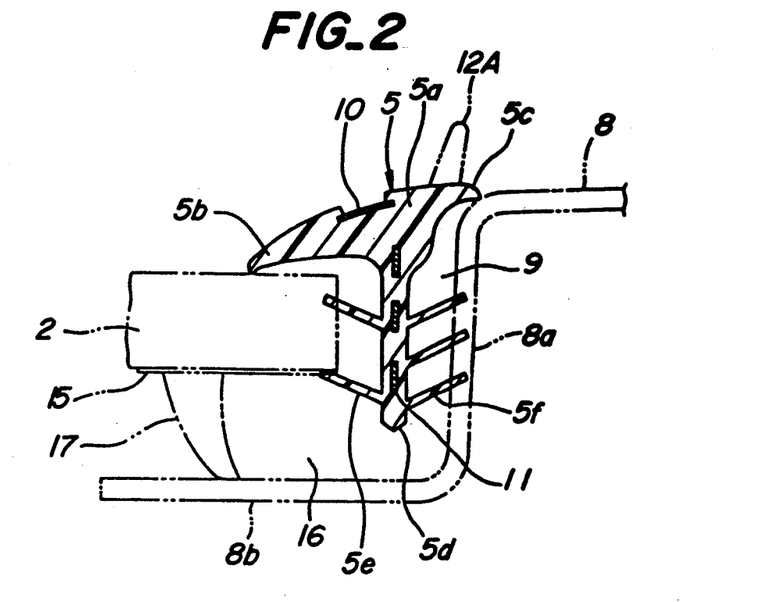
FIG. 2 is a cross-sectional view taken along the line A—A in FIG. 1, showing the upper segment of a windshield molding member.

As shown more particularly in FIG. 2, the upper segment 5 includes a main body 5a which is provided with a first lip section 5b to be engaged with the outer surface of a windshield plate 2, a second lip section 5c to be engaged with the outer surface of the vehicle body panel 8, and a leg section 5d to be inserted into a gap 9 between the edge of the windshield plate 2 and a stepped shoulder portion 8a of the body panel 8. The leg section 5d has fins 5e, 5f on both its sides, which are to be engaged with the periphery of the windshield plate 2 and the shoulder portion 8a, respectively, so as to prevent undesirable withdrawal of the leg section 5d out of the gap 9. The upper segment 5 has an ornamental film 10 and core elements 11 arranged in the main body 5a and the leg section 5d, respectively. The cross-section of the upper segment 5 is common to the side segments 6, and will thus be referred to as a "common cross-section".

Figure 3:
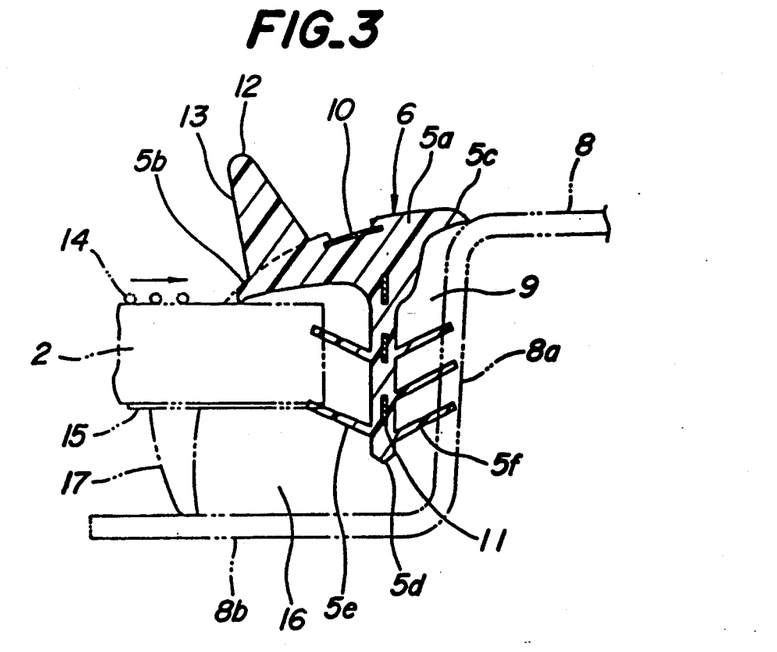
FIG. 3 is a cross-sectional view taken along the line B—B in FIG. 1, showing the side segment of the molding member.

That is, as shown in FIG. 3, the side segment 6 has a basic cross-sectional portion with the above-mentioned common cross-section of the upper segment 5, as well as an "additional cross-sectional portion" in the form of a ridge 12 on the first lip section 5b. The ridge 12 defines a channel or weir 13 extending along a side edge of the windshield plate 2, whereby rain water 14 on the windshield plate 2 can be guided along the ridge 12, and can be prevented from flowing onto the side windows 3 across the side segment 6 and the neighboring pillar of the vehicle body 1 to disturb the driver's sight through the side windows 3. On the other hand, the upper segment 5 without the ridge 12 on the first lip section 5b has a smooth outer surface, and thus, serves to realize a so-called flush outer surface along the upper edge of the windshield plate 2. The corner segment 7 for connecting the upper and side segments 5, 6 into an integral component has a cross-section which gradually changes from that of the upper segment 5 to that of the side segment 6.

When the molding member 4 is for a rear window of an automobile, the side segment 6 need not be provided with the ridge, and the upper segment 5 may be provided with a ridge 12A which is arranged on the second lip section 5c adjacent to the rear edge of the roof panel 8, as shown by imaginary line in FIG. 2. Such a ridge 12A serves to prevent rain water on the roof panel 8 from flowing across the molding member 4 and onto the rear window.

Incidentally, the windshield plate 2 is shown in FIGS. 2 and 3 as having a printed opaque layer 15 on the rear surface of its periphery, and being mounted along the periphery on a flange portion 8b of the body panel 8 with an adhesive material 16 and a dam rubber 17 arranged therebetween, in a conventional manner.

Figure 4:
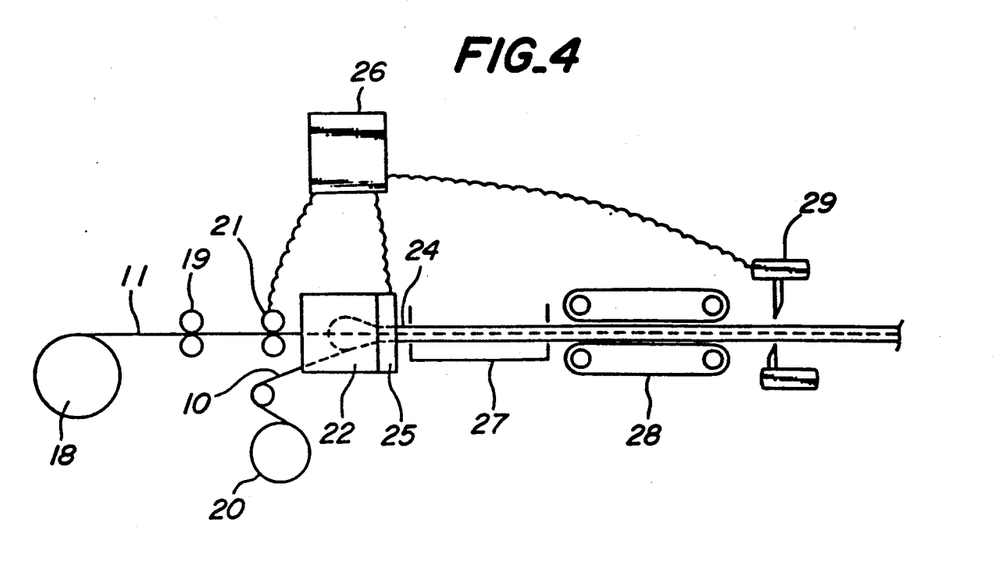
FIG. 4 is a schematic diagram of a production line which may be used to carry out the method according to the present invention for continuously and alternately manufacturing the upper and side segments of the molding member.

FIG. 4 shows the schematic diagram of a production line, which may be used to continuously manufacture the above-mentioned molding member 4 in accordance with the present invention. The production line includes an uncoiler 18 and an associated pinch roller 19 for feeding the core element 11, which may be of a material with a low elongation, such as a metal strip, polyester-based resin sheet or a strand of glass- or carbon-fibers. When the core element 11 is of a profiled cross-section, the pinch roller 19 may be replaced by a roll forming device. The production line further includes another uncoiler 20 for feeding the ornamental film 10 with an excellent weatherability.

The ornamental film 10 and the core element 11 are preferably applied with appropriate adhesive material. The feeding length of the core element 11 is detected by a detector 21, such as a rotary encoder. The ornamental film 10 and the core element 11 are fed to an extrusion die head 22 connected to an extruder, not shown. The extruder is adapted to heat a thermoplastic resin (e.g. PVC resin) to a temperature higher than its softening temperature, which is then fed to the die head 22 in a molten state.

Figure 9:
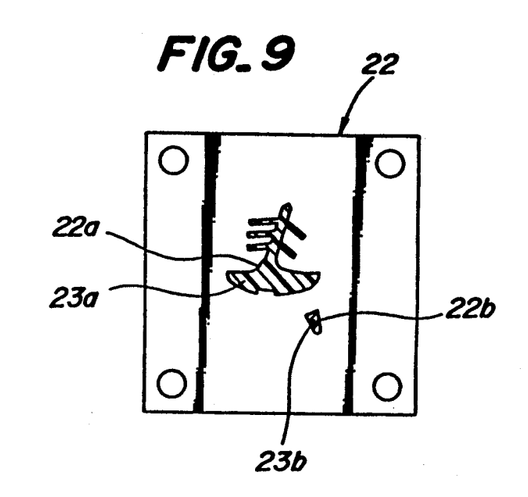
FIG. 9 is a front view of the extrusion die head.

The die head 22 has a pair of orifices 22a, 22b which are arranged spaced from, but preferably close to each other (FIG. 9). The orifice 22a has a cross-section corresponding to that of the basic, common cross-sectional portion of the upper and side segments 5, 6, and will be referred to as a "common orifice". The orifice 22b, in turn, has a cross-section corresponding to that of the additional cross-sectional portion or the ridge 12 of the side segment 6, and will be referred to as an "additional orifice".

Figure 5:
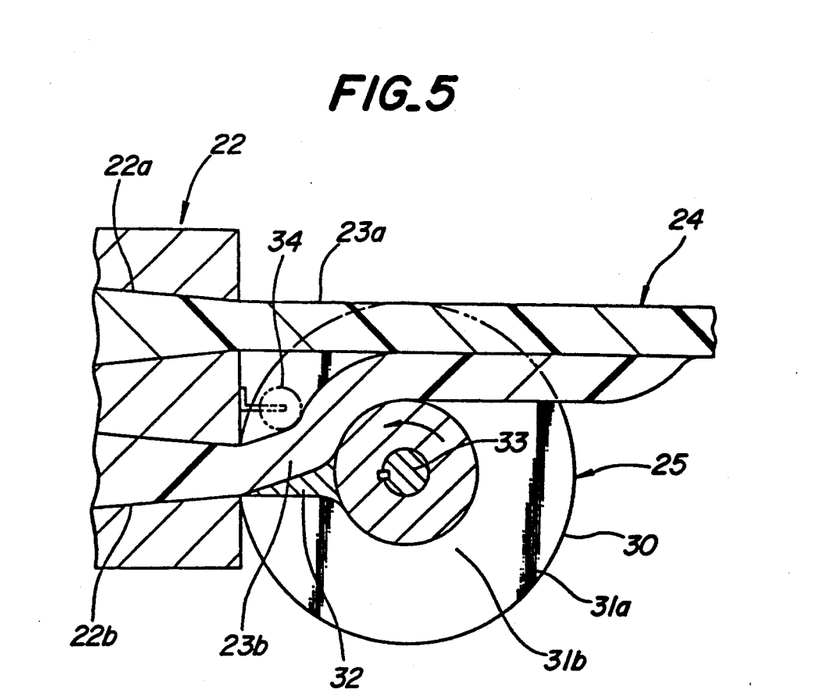
FIG. 5 is a fragmentary sectional view of the extrusion die head, with the guide device assuming one operative position causing the extruded bodies to adhere with each other.
Figure 6:
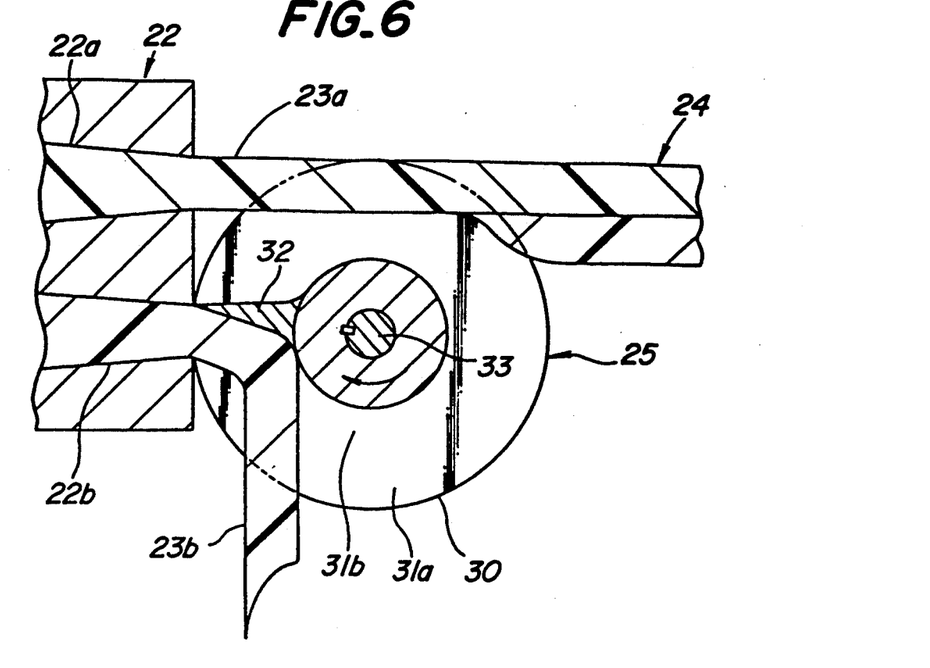
FIG. 6 is a similar sectional view of the extrusion die head, with the movable guide device assuming another operative position to maintain the extruded bodies spaced from each other.
Figure 7:
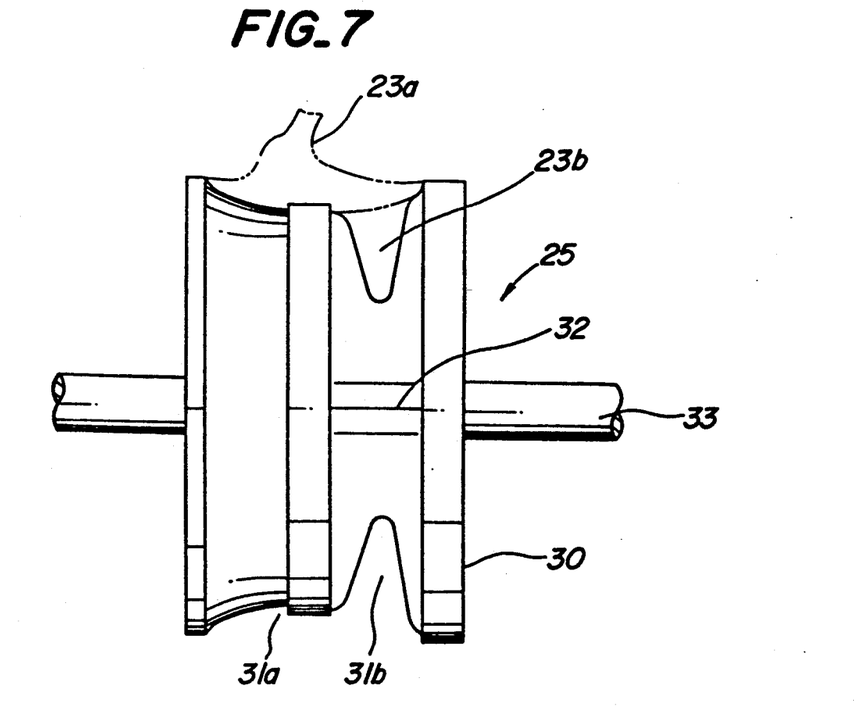
FIGS. 7 and 8 are front view and perspective view of the guide device, respectively.
Figure 8:
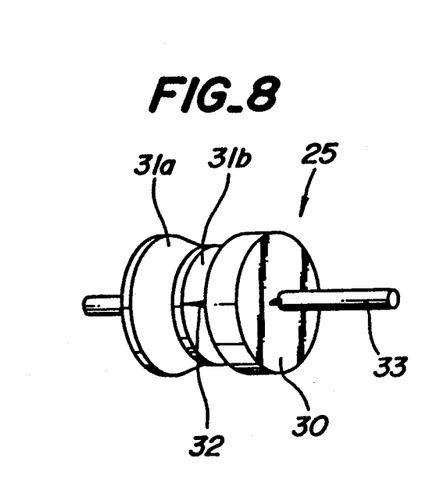

The molten resin fed from the extruder is extruded, together with the ornamental film 10 and the core element 11, from the common orifice 22a and the additional orifice 22b of the die head 22, into extruded bodies 23a, 23b. These extruded bodies 23a, 23b either adhere with each other, or are maintained spaced from each other, immediately after the extrusion, in accordance with the feeding length of the core element 11, thereby to form a desired continuous rod-like body 24. To this end, as also shown in FIGS. 5 and 6, a guide device 25 is arranged adjacent to, and on the discharge side of the die head 22, and is controlled by a controller 26 which is connected to the detector 21.

The continuous rod-like body 24, in which the extruded bodies 23a, 23b are either maintained in adhesion with, or spaced from each other according to the feeding length of the core element 11, is subsequently cooled in a cooling tank 27, hauled by a hauling device 28, and cut into a predetermined length of a molding member 4 by a cutting device 29 which also is connected with and controlled by the controller 26 according to the feeding length of the core element 11.

Referring to FIGS. 5 to 8, the guide device 25 includes a reciprocably rotatable guide wheel 30, which is formed in its outer periphery with a guide groove 31a for guiding the extruded body 22a corresponding to the common cross-sectional portion of the upper and side segments 5, 6, and also with a guide groove 31b for guiding the extruded body 22b corresponding to the additional cross-sectional portion or the ridge 12 of the side segment 6. The guide device 25 further includes a cutter 32 which extends from the bottom of the groove 31b as far as the periphery of the guide wheel 30, and which is adapted to cut away the extruded body 23b corresponding to the additional cross-sectional portion 12 perpendicularly to its longitudinal direction whenever necessary, as well as a drive shaft 33 connected to a reversible servomotor (not shown) which is controlled by the controller 26.

Figure 10:
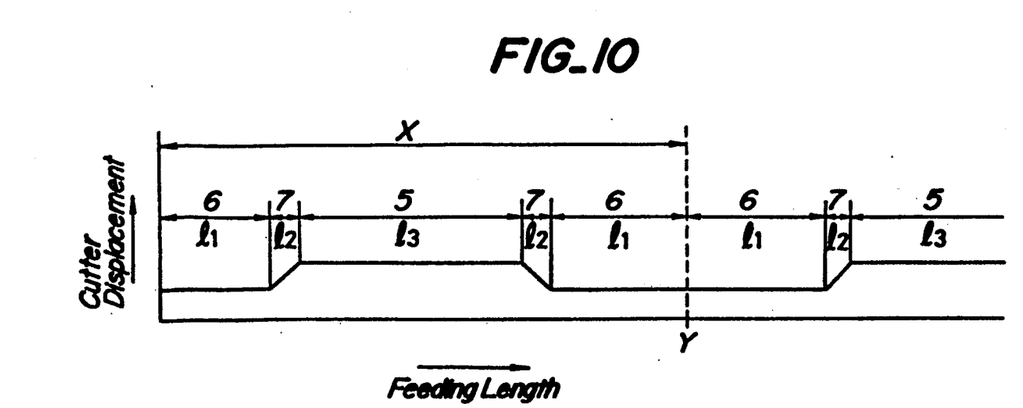
FIG. 10 is a diagram showing the relationship between the feeding length of the core element and the displacement of the cutter element.

For a molding member 4 with the side segments 6 of a length $l_1$, the corner segments 7 of a length $l_2$ and the upper segment of a length $l_3$, the relationship between the feeding length of the core element 11 and the angular displacement of the cutter 32 of the guide device 25 is as shown in FIG. 10.

More particularly, starting by way of example from an operational mode shown in FIG. 5 of the production line, the extrusion of the resin is carried out with the cutter 32 of the guide device 25 in abutment with the lower edge of the additional orifice 22b such that the extruded body 23b corresponding to the additional cross-sectional portion 12 of the side segment 6 is guided by the cutter 32 and the guide groove 31b so as to be brought into contact with, and adhesion to the extruded body 23a corresponding to the common cross-sectional portion. This serves to form a side segment 6 of the molding member 4.

As the detector 21 detects the feeding length $l_1$ of the core element 11, or completion of the formation of the side segment 6, the servomotor is actuated to drive the shaft 33 at a predetermined angular speed and displace the cutter 32. By this, the cutter 32 is gradually forced into the extruded body 23b to form the corner segment 7.

Upon a subsequent detection of the feeding length $l_2$ of the core element 11, or of the completion of the formation of the corner segment 7, the servomotor is stopped by the controller 26. On this occasion, as shown in FIG. 6, the cutter 32 has already been brought into abutment with the upper edge of the additional orifice 22b, after completely cutting away the extruded body 23b corresponding to the additional cross-sectional portion 12. The extruded body 23b is thus guided by the cutter 32 and the guide groove 31b as being maintained spaced from the extruded body 23a, thereby permitting formation of the upper segment 5 with the common cross-sectional portion only.

As the detector 21 detects the feeding length $l_3$ of the core element 11, or completion of the formation of the upper segment 5, the servomotor is actuated to drive the shaft 33 in a reverse direction and displace the cutter 32 back to its initial position shown in FIG. 5 into abutment with the lower edge of the additional orifice 22b, after cutting away the extruded body 23b. Thus, the extruded body 23b corresponding to the additional cross-sectional portion 12 of the side segment 6 is guided by the cutter 32 and the guide groove 31b so as to be brought into contact with and adhesion to the extruded body 23a to form another side segment 6.

The above-mentioned steps are repeated to continuously produce a desired number of the molding members 4. It is of course that the individual molding member 4 are obtained by cutting the continuous rod-like body 24 by means of the cutting device 29. The length of each molding member 4 ($=2l_1+2l_2+l_3$) is represented in FIG. 10 by X, and the location of the continuous rod-like body 24 to be subjected to the cutting is shown at Y.

The resin material to be extruded from the common orifice 22a and the additional orifice 22b may be same as, or different from each other, e.g. in color, transparency and/or hardness. In the latter case, the extrusion die head 22 is associated with two extruders and is preferably fed with mutually compatible resins. If the mutually compatible resins do not still exhibit a good adhesion to each other, or when resins having poor compatibility with each other are used the extruded body 22b for the additional cross-sectional portion 12 may be applied with an adhesive material by a roll coater 34 as shown in FIG. 5 immediately after it has been extruded from the orifice 22b. Furthermore, because the extruded bodies 23a, 23b are guided by the grooves 31a, 31b in a still hot state of the resin, these grooves are preferably composed of stainless steel, ceramics, appropriate synthetic resin or the like, having a smooth outer surface and exhibiting a poor adhesion to the extruded bodies 23a, 23b.

There is shown in FIGS. 11 to 15 another embodiment of the guide device arranged adjacent to the extrusion die head 22 wherein the common orifice 22a is situated below the additional orifice 22b. The guide device according to the present embodiment, designated as a whole by reference numeral 40, includes a cutter element 41 on the upper side, and a support element 42 on the lower side, which are vertically spaced from each other by a predetermined distance. The cutter element 41 and the support element 42 are adapted to swing about respective horizontal axes near their front ends, such that their rear ends adjacent to the die head 22 are reciprocably movable in a vertical direction.

The cutter element 41 has a cross-section which conforms with the outer contour of the extruded body 23b or of the additional cross-sectional portion 12 of the molding member 4, and is provided with brackets 43a–43d on both sides of the front and rear ends, as well as a stopper 44 formed thereon. The support element 42 has a cross-section which conforms with the bottom of the extruded body 23b, and is provided with brackets 45a–45d on both sides of the front and rear ends. The brackets 43a–43d of the cutter element 41 are connected to the brackets 45a–45d of the support element 42 by link elements 46a–46d, respectively, such that the cutter element 41 and the support element 42 are jointly moved maintaining a constant space therebetween. The link elements 46c and 46d are connected by a bifurcated arm 47 to a threaded drive shaft 48. The drive shaft 48 is connected to a servomotor (not shown) which is controlled by a controller in accordance with the feeding length of the core element 11 as in the previous embodiment.

In order to avoid an undesirable interference of the cutter element 41 with the extrusion die head 22, preferably, the rear end of the cutter element 41 and the front end surface of the die head 22 each has a radius of curvature which conforms to the trajectory of the rear end of the cutter element 41. The support element 42 may be constructed in the same manner, or may alternatively be spaced a slight distance from the additional orifice 22b in the die head 22.

The support element 42 has a width which gradually decreases forwardly from its rear end adjacent to the die head 22. Thus, the extruded body 23b corresponding to the additional cross-sectional portion 12 can be positively supported by the support element 42, and accurately guided onto the desired location of the extruded body 23a which, in turn, corresponds to the common cross-sectional portion of the molding member 4. Advantageously, the support element 42 has a smooth sliding surface for the extruded body 23b, to reduce the sliding resistance and avoid an undesirable deformation of the extruded body 23b.

Figure 11:
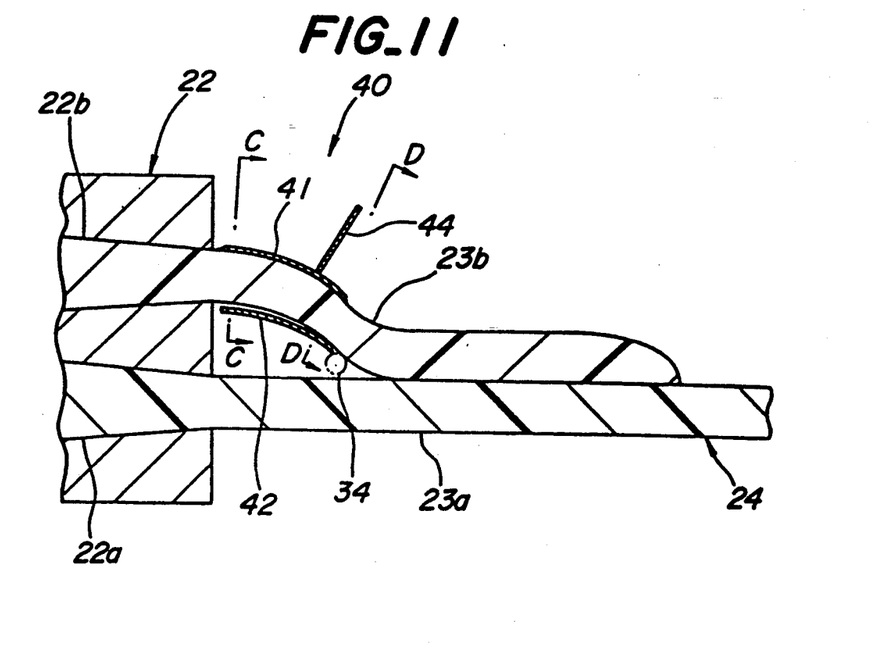
FIGS. 11 and 12 are fragmentary sectional views of another embodiment of the guide device.
Figure 12:
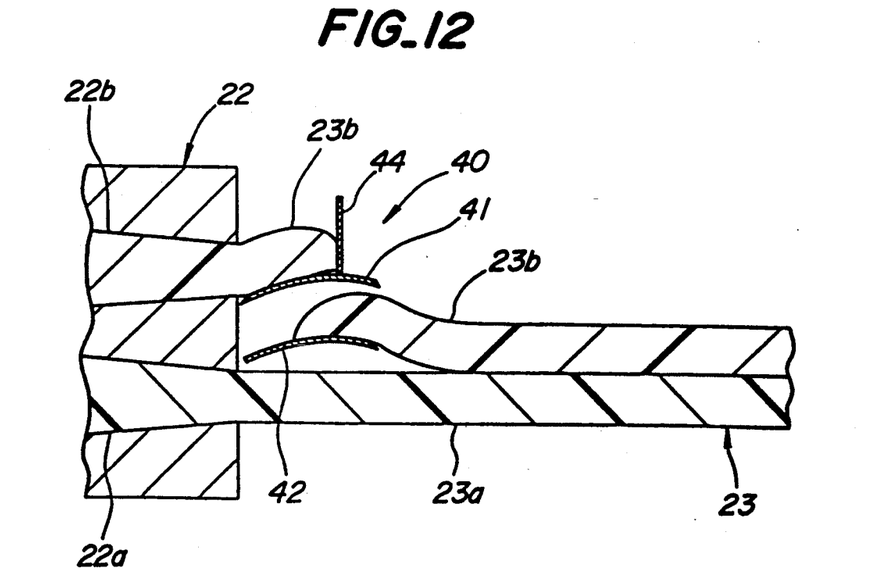
Figure 13:
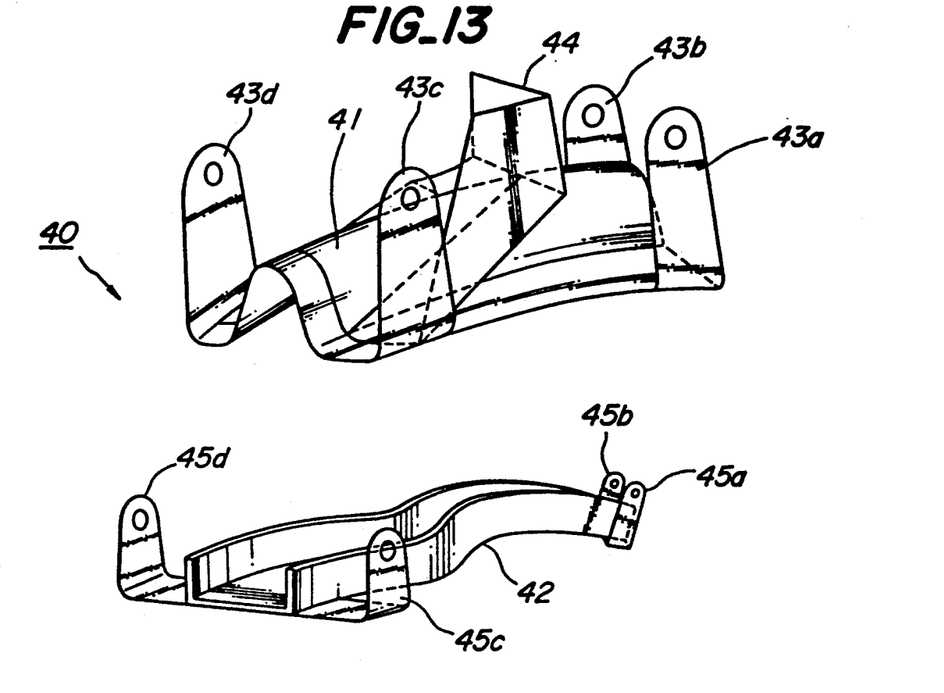
FIG. 13 is a perspective view of the guide device shown in FIGS. 11 and 12.
Figure 14:
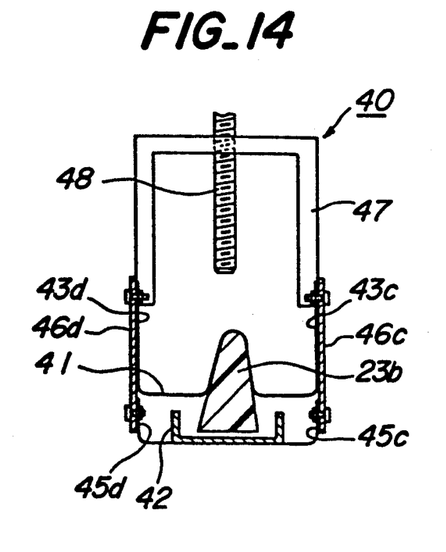
FIGS. 14 and 15 are cross-sectional views taken along the lines C—C and D—D in FIG. 11, respectively.
Figure 15:
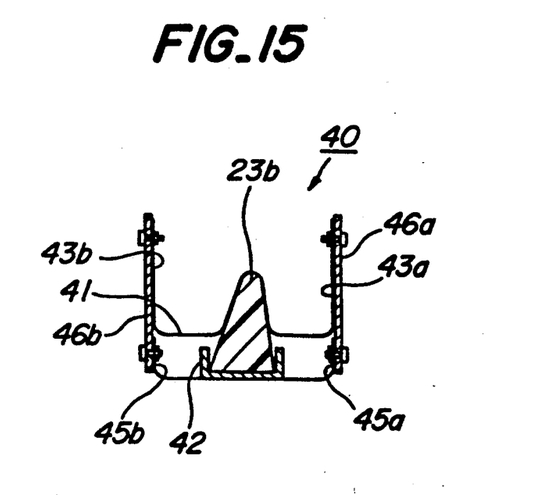

With the above-mentioned arrangement of the guide device 40, in order to form the side segment 6, the extruded body 23b is caused to adhere to the extruded body 23a in the operational mode shown in FIG. 11. Thereafter, the drive shaft 48 is rotated by the servomotor to lower the rear ends of the cutter element 41 and the support element 42 so that the extruded body 23b for the additional cross-sectional portion 12 is cut by the cutter element 41. On this occasion, the extruded body 23b comes into abutment with the stopper 44, and is thereby deflected toward one side of the device 40 and then vertically downwardly by the gravity. By this, the extruded body 23b is maintained out of contact with the extruded body 23a to form the upper segment 5 of the molding member 4, and may be collected into a receptacle to be used once again, if desired. Furthermore, when it is necessary to apply adhesive material to the extruded body 23b before it is brought into adhesion with the extruded body 22a, the guide device 40 may be associated with a roll coater 34 as shown by an imaginary line in FIG. 11.

In the embodiment shown in FIGS. 11 to 15, when the extruded body 22b for the additional cross-sectional portion 12 is extruded on the lower side of the extruded body 22a for the common cross-sectional portion, the region of the extruded body 22b to be adhered to the extruded body 22a has to be supported by the support element 42, while the region of the extruded body 22b to be prevented from adhesion to the extruded body 22a can be guided vertically downwardly by the gravity. Conversely, when the extruded body 22b for the additional cross-sectional portion 12 is extruded on the upper side of the extruded body 22a for the common cross-sectional portion, the region of the extruded body 22b to be adhered to the extruded body 22a can be guided vertically downwardly by the gravity into contact with the extruded body 23a, while the region of the extruded body 22b to be prevented from adhesion to the extruded body 22a has to be guided by the guide device 40. The common orifice 22a and the additional orifice 22b may be spaced from each other not only in the vertical direction, but also in the horizontal direction.

The operation of the production line in the above mentioned embodiment is controlled in accordance, with the feeding length of the core element 11, as a parameter which represents the length of the synthetic resin extruded from the common orifice 22a in the form of the rod-like body 24, by arranging the detector 21 on the upstream side of the extrusion die head 22, as shown in FIG. 4. It is alternatively possible to arrange the detector 21 on the downstream side of the die head 22 and detect the extruded length of the rod-like body 24, per se, or the hauling length as the parameter in question.

Finally, instead of selectively causing the extruded body 23b to adhere to the extruded body 23a or to be maintained spaced therefrom after it has been extruded from the additional orifice 22b, the die head 22 may have an inner gate for allowing or interrupting extrusion of the resin from the additional orifice 22b.

It will be appreciated from the foregoing description that, in accordance with the present invention, it is readily possible to reliably manufacture different segments of basically same and slightly different cross-section in an alternate and continuous manner and with a higher productivity, using a single extrusion die head with a common orifice and at least one additional orifice, and by selectively preventing adhesion of the extruded resin materials from the common orifice and the additional orifice, or causing the extruded materials to adhere with each other.

The present invention thus allows manufacture of various elongate articles, including molding members, having an excellent appearance with a smooth outer surface throughout the entire length, and without significant connection lines between different segments, as well as a remarkable reduction in the manufacturing cost.

What is claimed is:

1. An apparatus for manufacturing elongate articles including a plurality of segments which are connected with each other in the longitudinal direction of the article, each segment having a common cross-sectional portion which is common to all the segments, at least one segment further having at least one additional cross-sectional portion, said apparatus comprising:
   a single extrusion die head formed with a common orifice of a cross-section which corresponds to that of said common cross-sectional portion of a segment, said die head also formed with at least one additional orifice of a cross-section corresponding to that of said additional cross-sectional portion of said at least one segment;
   means for detecting a parameter representing the length of the synthetic resin material extruded from said common orifice;
   means for selecting and controlling first and second operational modes of the apparatus in accordance with said detected length such that, in said first operational mode of the apparatus, synthetic resin material is extruded from both said common orifice and said at least one additional orifice of said die head and the extrudant from said at least one additional orifice is diverted away from the extrudant of said common orifice to form a first extruded body corresponding to a first segment and, in said second operational mode of the apparatus, synthetic resin materials are extruded from both said common orifice and said at least one additional orifice of said die head and caused to adhere with each other while they are still sufficiently hot to achieve an adhesion, to form a second extruded body corresponding to a second segment;
   a guide means for moving between a first position for forming said first segment, and a second position for forming said second segment and a cutter means for cutting said synthetic resin material extruded from said additional orifice when effecting a change from said first operational mode to said second operational mode, and vice versa.

2. The apparatus as claimed in claim 1, wherein said die head is associated with a single extruder.

3. The apparatus as claimed in claim 1, wherein said means for selecting and controlling the first and second operational modes of the apparatus comprises a guide means adapted to be moved between a first position for forming said first segment, and a second position for forming said second segment.

4. The apparatus as claimed in claim 3, wherein said guide device includes a cutter means for cutting said synthetic resin material extruded from said additional orifice when effecting a change from said first operational mode to said second operational mode, and vice versa.

* * * * *